July 21, 1953          A. L. FUSTER          2,646,250
PERMANENTLY MOUNTED MOTOR VEHICLE JACK
Filed Nov. 16, 1949          3 Sheets-Sheet 1
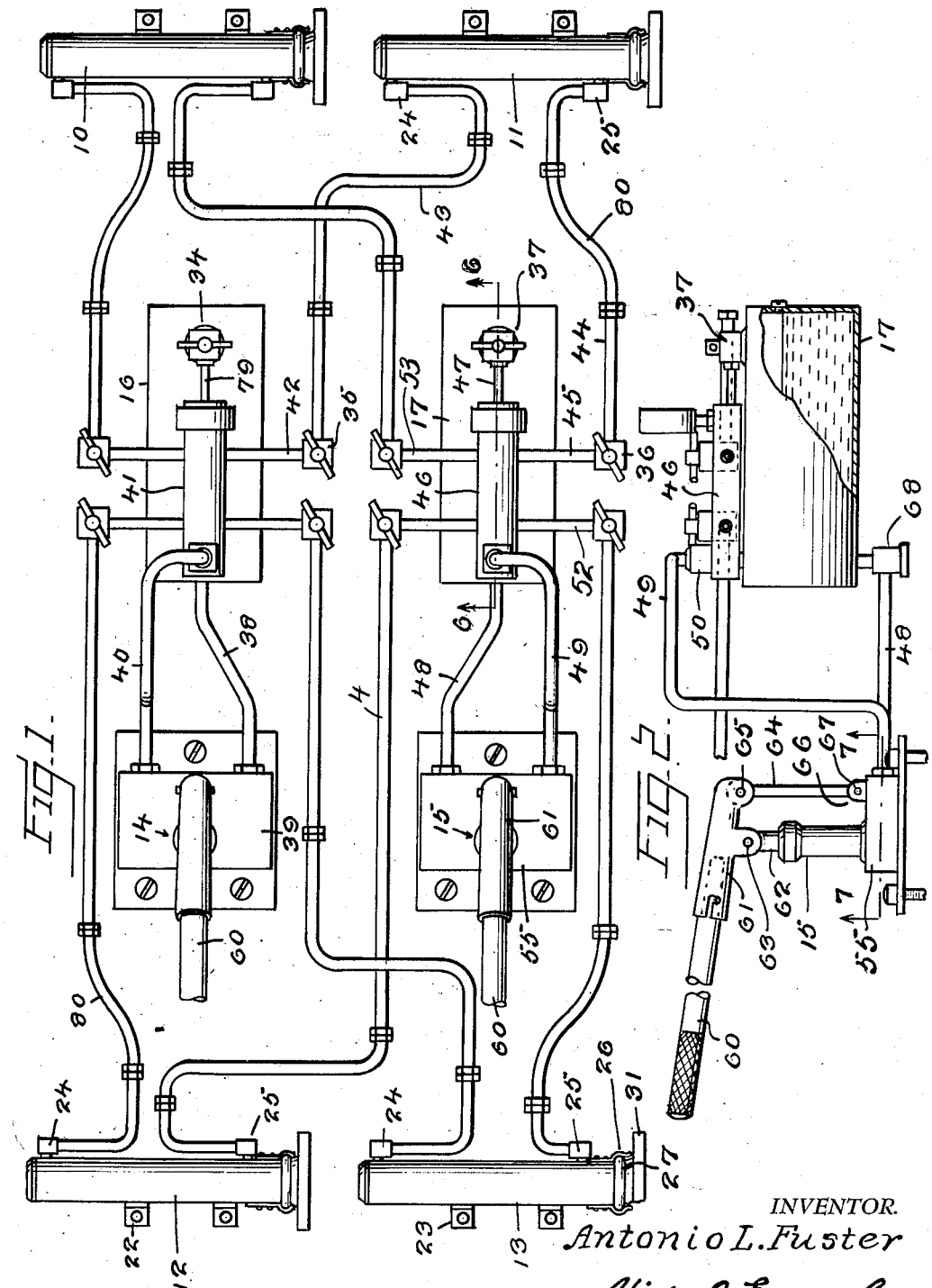
INVENTOR.
*Antonio L. Fuster*
BY *Victor J. Evans & Co.*
ATTORNEYS

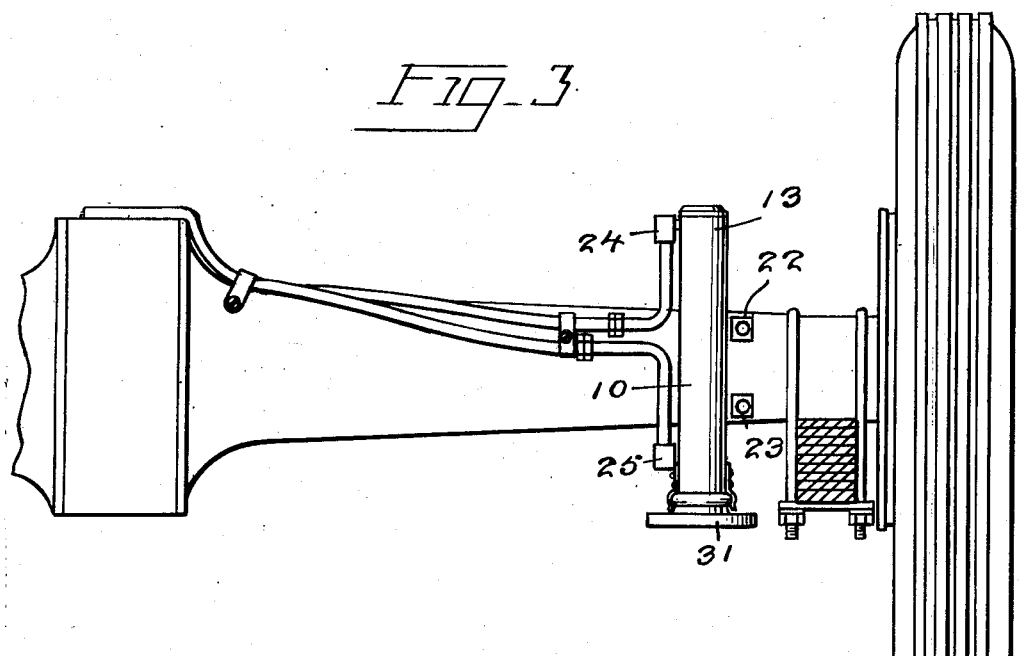
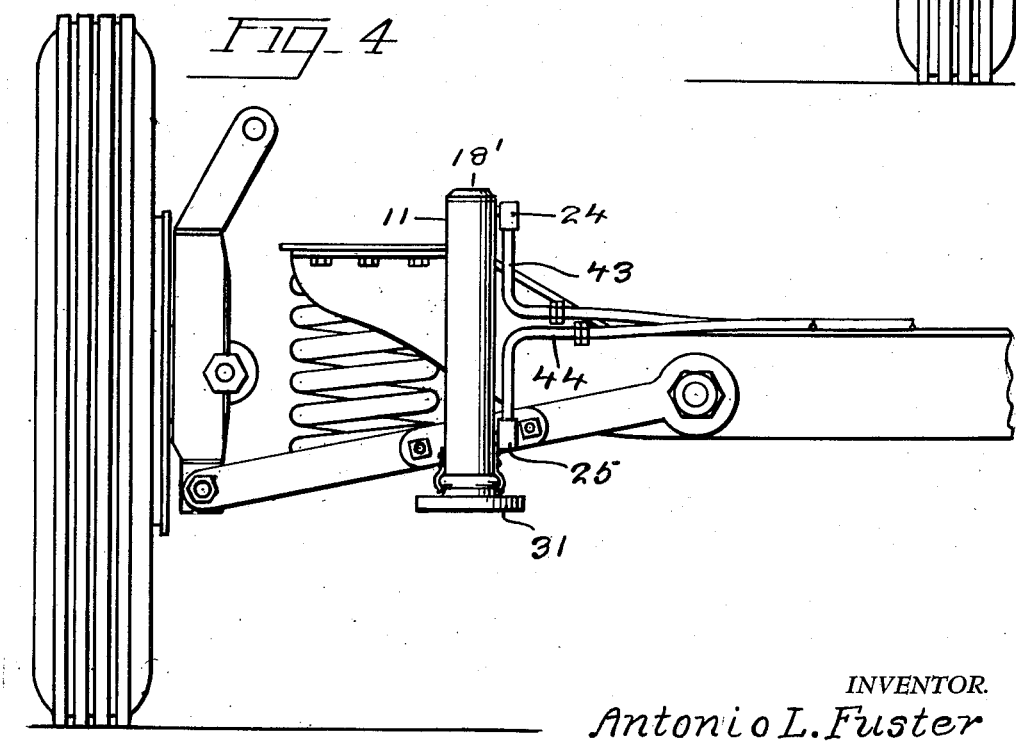

July 21, 1953  A. L. FUSTER  2,646,250
PERMANENTLY MOUNTED MOTOR VEHICLE JACK
Filed Nov. 16, 1949  3 Sheets-Sheet 3
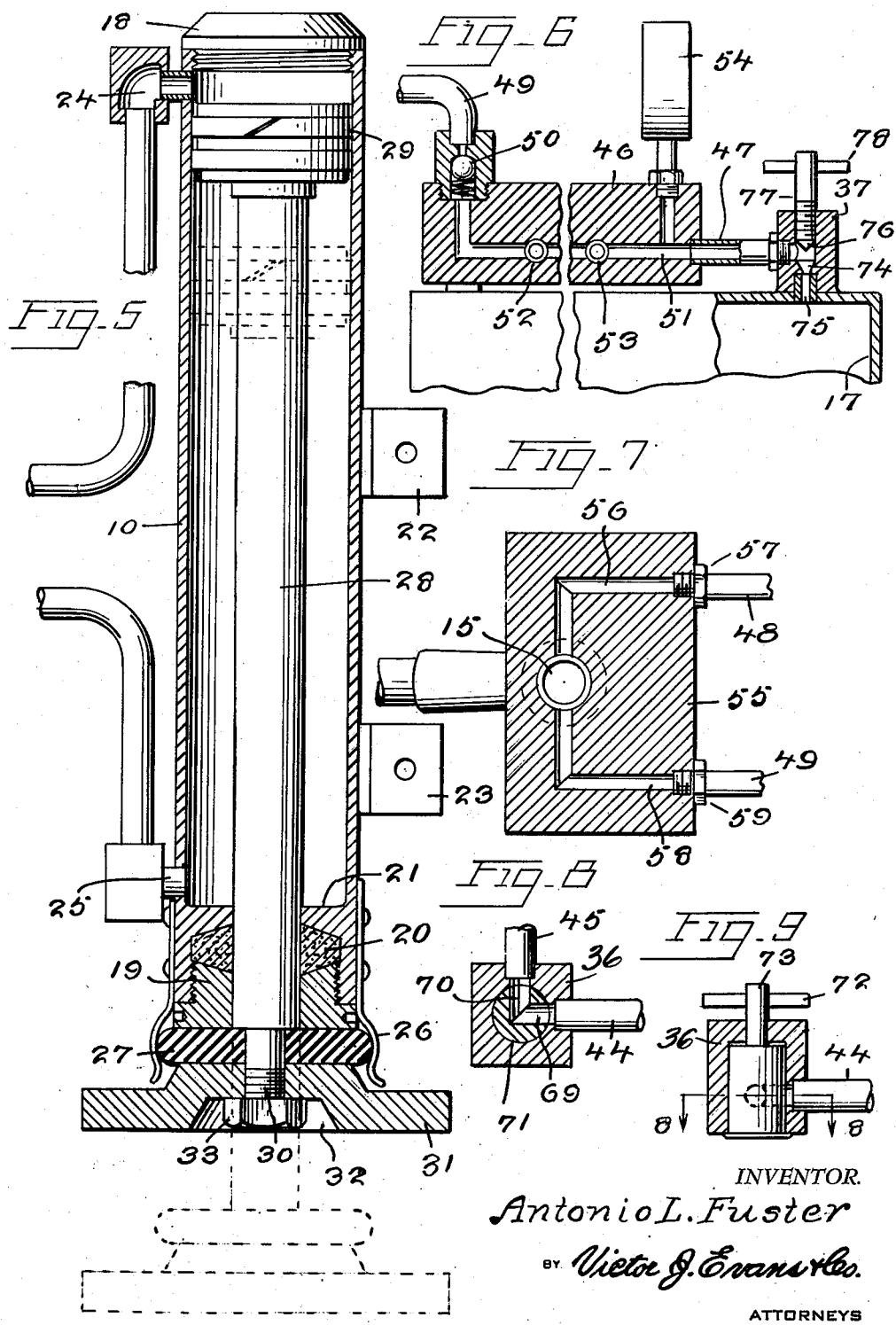
INVENTOR.
Antonio L. Fuster
BY Victor J. Evans & Co.
ATTORNEYS Patented July 21, 1953

2,646,250

UNITED STATES PATENT OFFICE 2,646,250

PERMANENTLY MOUNTED MOTOR VEHICLE JACK

Antonio L. Fuster, Delano, Calif.

Application November 16, 1949, Serial No. 127,654

2 Claims. (Cl. 254—86)

This invention relates to hydraulic jacks of the type permanently mounted on motor vehicles with a jack positioned inside of each wheel, and in particular the invention relates to a vertically positioned hydraulic jack positioned on the axles inside of wheels and controlled and actuated from the rear compartment of the vehicle by a hand actuated pump with tubular connections from the pump to the jacks and with oil tanks and valves in the said connections.

The purpose of this invention is to provide a hydraulic system for actuating permanently installed motor vehicle jacks whereby the four wheels of the vehicle may be raised independently to repair or replace a tire or the like.

Various attempts have been made to install jacks on motor vehicles but with the usual type of hydraulic jack the weight is excessive and the operating instrumentalities associated therewith are costly and complicated. With this thought in mind this invention contemplates a plurality of hydraulic jacks including pistons in cylinders carried by the axles of the vehicle positioned inside of the wheels of the vehicle and hand actuated pumps positioned in a rear compartment of the vehicle for actuating the jacks.

The object of this invention is, therefore, to provide an improved and simplified motor vehicle jack system whereby jacks permanently mounted inside of the wheels of the vehicle may readily be raised and lowered by hand actuated pumps positioned in the rear compartment of the vehicle.

Another object of the invention is to provide a permanently installed hydraulic jack system for motor vehicles that may be installed on vehicles now in use.

A further object of the invention is to provide an improved hydraulic jack suitable for motor vehicles which is of a comparatively simple and economical construction.

With these and other objects and advantages in view the invention embodies comparatively light weight tubular cylinders permanently mounted on axles of a vehicle adjacent the wheels with pistons having based plates on the lower ends of the piston rods thereof provided in the cylinders and with oil tanks and hand pumps positioned in the vehicle and permanently connected to the cylinders for raising and lowering pistons therein.

Other features and advantages of the invention will appear from the description taken in connection with the drawings wherein Figure 1 is a diagrammatic view illustrating the layout of the motor vehicle hydraulic jack system.

Figure 2 is a detail illustrating the hand pump and oil tank included in the system with other parts omitted, with parts in elevation, and parts broken away and shown in section.

Figure 3 is a detail illustrating one of the jacks of the system mounted on the axle of one of the rear wheels of the vehicle.

Figure 4 is a similar detail showing a jack mounted on the front axle adjacent one of the front wheels of the vehicle.

Figure 5 is a vertical section through the hydraulic jack with parts of the connecting tubes broken away.

Figure 6 is a longitudinal section through an oil block distributor for preventing more than one jack being operated on one side of the system at one time, said section being taken on line 6—6 of Figure 1.

Figure 7 is a sectional plan through the base of the hand actuated pump being taken on line 7—7 of Figure 2.

Figure 8 is a sectional plan through one of the valves of the system being taken on line 8—8 of Figure 9.

Figure 9 is a vertical section through one of the valves of the system.

Referring now to the drawings wherein like reference characters denote corresponding parts the motor vehicle jack system of this invention includes a plurality of cylinders 10, 11, 12, and 13, hand actuated pumps 14, and 15, oil reservoirs for tanks 16, and 17, valves, and suitable connections connecting cylinders to the pump and tank.

The cylinders, as illustrated in Figure 5, are formed with tubular casings with heads 18 threaded in the upper ends and with packing glands 19 threaded in the lower ends with packing 20 secured between the glands 19 and webs 21 in the lower ends of the cylinders.

The cylinders are provided with mounting clips 22 and 23 for attaching the cylinders to the axles or other parts of the vehicle and these clips may be positioned to correspond with structural elements of the vehicle to which the clips may be attached.

Each cylinder is provided with a connection 24 at the upper end and a connection 25 at the lower end.

The cylinders are also provided with spring clips 26 which snap over the friction discs 27 on the lower ends of piston rods 28 for holding the piston rods and pistons 29 on the inner ends of the rods, upwardly in the cylinders, as in the position illustrated in full line in Figure 5.

The lower ends of the piston rods are provided with threaded studs 30, and base plates 31 with recesses 32 therein are secured on the studs by nuts 33.

With the cylinders permanently mounted on the chassis or axles of a vehicle the pistons with the base plates 31 remain in the upward position as illustrated in Figure 5 and when it is desired to use the jack fluid under pressure is supplied through the upper end of the cylinder to the port 24 whereby the piston is forced downwardly and the base plate 31 on the lower end of the piston rods, moves downward to engage the paving or ground. The dot and dash line shows a piston and base plate as the downward movement is started.

For the purpose of this description, the pump 14 is referred to as the "up" pump and the pump 15 as the "down" pump, and when it is desired to raise the right front wheel of the vehicle with the jack 11 the inlet valve 34 of the "up" pump 14 is closed, the valve 35 is opened, the valve 36 is opened and the inlet valve 37 of the "down" pump is opened. The pump 14 is then actuated whereby fluid is withdrawn from the tank 16 through the connection 38 and supplied to the pump base 39. From the pump 14 the fluid is pumped through the connection 40 to the oil block distributor 41. From the block 41 fluid passes through the connections 42 and 43 to the upper end of the cylinder through the port 24. Fluid below the piston 29 is carried through the connections 44 and 45 to the oil block distributor 46 and from this block 46 through the connection 47 and the valve 37 to the tank 17.

To reverse the movement of the jack 11 to lower the right wheel the valve 37 is closed, the inlet valve 34 is opened and the down pump 15 is actuated drawing fluid from the tank 17 to the connection 48 and discharging the fluid through the connection 49 to the block 46 and from the block through the connections 45 and 44 at the lower end of the cylinder 11.

By opening and closing corresponding valves the jack associated with each wheel of the vehicle may be actuated by the up and down pumps to raise and lower the wheels as desired.

As illustrated in Figure 6 the connections such as the connections 49 that extend from the pump to the oil block are provided with check valves 50 and these connections communicate with a passage 51 that extends to inlet valves such as the valves 37 and that also communicate through connections such as the connection 45 with the cylinders of the different jacks. In the design illustrated in Figure 6 block 46 is provided with a transverse passage 52 that connects the block 46 to the left rear wheel jack of the vehicle through a tube 4 and also to a passage 53 that connects the block to the left front wheel jack of the vehicle. The block is provided with a gauge 54 for indicating the pressure of the fluid.

The base 55 of the pump 15 is similar to the base 39 of the pump 14 and as illustrated in Figure 7 the base 55 is provided with an inlet connection 56 having a threaded socket 57 therein and also a discharge connection 58 having a threaded socket 59 therein. The passages 56 and 58 communicate with the interior of the pump cylinder 15.

The pumps are provided with operating handles 60 that may be freely positioned in open sockets in the ends of levers 61 and the levers are pivotally connected to connecting rods 62 of pistons of the pumps by pins 63 and also to the base 55 by a link 64 the front end of which is pivotally attached to the lever 61 by a pin 65 and to the other two ears 66 on the base 55 by a pin 67. In the pump 15 the passage 56 communicates with the connection 49 and the passage 58 with the connection 48, the connection 48 having a check valve 68 therein.

A typical valve 36 is illustrated in Figures 8 and 9 and these valves are used in the connections 42 and 45 in which they are indicated by the numerals 35 and 36, however, the same valves are used in the connections to all of the jack cylinders. In this design the valve body 18, particularly referring to the valve 36, is provided with side connections 44 and 45 which communicate with openings 69 and 70, respectively, in a core 71 actuated by handle 72 through a stem 73. It will be understood, however, that any suitable valve may be used.

With the parts arranged in this manner and with the cylinders 10 and 11 mounted on the front axle of the vehicle and the cylinders 12 and 13 mounted on the rear axle, fluid may be pumped from a tank or tanks positioned in a compartment in the rear of the vehicle to the cylinders, respectively, and as the jacks are relieved fluid passes back to the tanks to the inlet valves 34 and 37 which, as illustrated in Figure 6 are positioned on the tank body with a valve seat 74 positioned in the valve body and connected to the interior of the tank through the connection 75. The valves 76 are provided on the ends of threaded stems 77 with handles 78 on the outer ends thereof. These valves are connected by the connections 47 and 79 to the passages 51 of the oil block distributor.

With the up and down pumps and associated tanks positioned in the rear compartments of the vehicle, and with the jacks mounted on the front and rear axles the jack cylinders are connected to the pump and tanks through suitable pipes or tubes extended through the chassis of the vehicle. These connections may be provided with flexible tubing or hose as indicated by the numeral 80 as flexible connections are required.

It will be understood that modifications may be made in the design and arrangement of the parts without departing from the spirit of the invention.

What is claimed is:

1. In a motor vehicle jack, the combination which comprises a vertically disposed cylinder having mounting clips extended therefrom for attaching the cylinder to an axle of a motor vehicle, a piston positioned in the cylinder, a piston rod extended from the piston and extended from the lower end of the cylinder, a packing gland in the lower end of the cylinder through which the piston rod extends, said piston rod having a threaded stud of a diameter less than that of the piston rod extended from the lower end and positioned to provide a shoulder at the lower end of the piston rod, a friction disc positioned on the said threaded stud, a base plate having a recess in the under surface positioned on the said threaded stud, a nut on the said threaded stud retaining the base plate in position and clamping the said friction disc against the shoulder of the piston rod, spring clips extended from the cylinder and positioned to snap over the peripheral edge of the said friction disc for retaining the piston, piston rod and base plate in elevated positions, a fluid pressure tank, supply and return connections from the fluid pressure tank to upper and lower ends of the cylinder, and a pump connected to the said pressure tank.

2. In a motor vehicle jack, the combination which comprises a plurality of vertically disposed cylinders each having a mounting clip extended therefrom for attaching the cylinder to an axle of a motor vehicle, a piston positioned in the cylinder, a piston rod extended from the piston and extended from the lower end of the cylinder, a packing gland in the lower end of the cylinder through which the piston rod extends, said piston rod having a threaded stud of a diameter less than that of the piston rod extended from the lower end and positioned to provide a shoulder at the lower end of the piston rod, a friction disc positioned on the said threaded stud, a base plate having a recess in the under surface positioned on the said threaded stud, a nut on the said threaded stud retaining the base plate in position and clamping the said friction disc against the shoulder of the piston rod, spring clips extended from the cylinder and positioned to snap over the peripheral edge of the said friction disc for retaining the piston, piston rod and base plate in elevated positions, a pair of fluid pressure tanks, a pump connected to each of said pressure tanks, and connections from the said pressure tanks to upper and lower ends of the cylinders whereby one of said tanks provides fluid under pressure for extending the piston rods and base plates and the other supplies fluid under pressure for retracting the piston rods and base plates.

ANTONIO L. FUSTER.

References Cited in the file of this patent

UNITED STATES PATENTS

| Number | Name | Date |
| --- | --- | --- |
| 1,538,167 | Chappell | May 19, 1925 |
| 1,995,241 | Chavez | Mar. 19, 1935 |
| 2,021,733 | Luker | Nov. 19, 1935 |
| 2,145,847 | Carpenter | Feb. 7, 1939 |
| 2,281,413 | Chaffee | Apr. 28, 1942 |
| 2,451,407 | Paolucci | Oct. 12, 1948 |
| 2,472,294 | Hall | June 7, 1949 |